United States Patent Office 2,709,713
Patented May 31, 1955

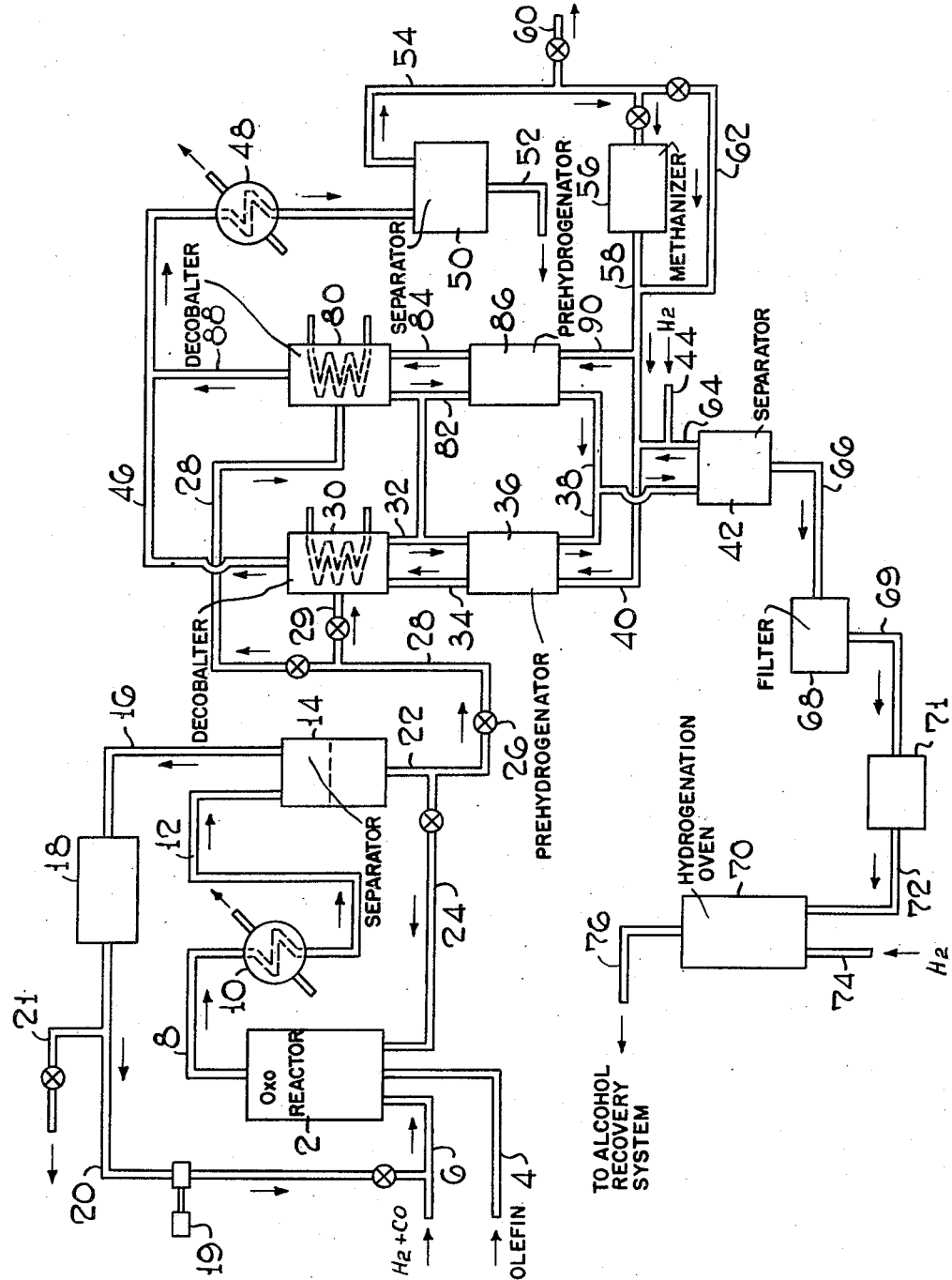

2,709,713

IRON REMOVAL FROM ALDEHYDE SYNTHESIS PROCESS

Joseph K. Mertzweiller and Charles N. Kimberlin, Jr., Baton Rouge, La., assignors to Esso Research and Engineering Company, a corporation of Delaware Application February 25, 1950, Serial No. 146,294

5 Claims. (Cl. 260—638)

The present invention relates to the preparation of oxygenated organic compounds by the reaction of carbon monoxide and hydrogen with carbon compounds containing olefinic linkages in the presence of a carbonylation catalyst. More specifically, this invention relates to an improved process for removing metallic impurities from the reaction products resulting from the interaction of olefinic compounds with carbon monoxide and hydrogen.

It is now well known in the art that oxygenated organic compounds may be synthesized from organic compounds containing olefinic linkages by a reaction with carbon monoxide and hydrogen in the presence of a catalyst containing metals of the iron group, such as cobalt or iron, preferably the former, in an essentially three stage process. In the first stage, the olefinic material, catalyst and the proper proportion of CO and $H_2$ are reacted to give a product consisting predominantly of aldehydes containing one more carbon atom than the reacted olefin. This oxygenated organic mixture, which contains dissolved in it salts and the carbonyls and molecular complexes of the metal catalyst, is treated in a second stage to cause removal of soluble metal compounds from the organic material in a catalyst removal zone. The catalyst-free material is then generally hydrogenated to the corresponding alcohols, or may be oxidized to the corresponding acid.

This carbonylation reaction provides a particularly attractive method for preparing valuable primary alcohols which find large markets, particularly as intermediates for plasticizers, detergents and solvents. Amenable to the reaction are long and short chained olefinic compounds, depending upon the type alcohols desired. Not only olefins, but most organic compounds possessing at least one non-aromatic carbon-carbon double bond may be reacted by this method. Thus, straight and branch chained olefins and diolefins such as propylene, butylene, pentene, hexene, butadiene, pentadiene, styrene, olefin polymers such as di- and triisobutylene and hexene and heptene dimers, polypropylene, olefinic fractions from the hydrocarbon synthesis process, thermal or catalytic cracking operations, and other sources of hydrocarbon fractions containing olefins may be used as starting material, depending upon the nature of the final product desired.

The catalysts in the first stage of the process are usually added in the form of salts of the catalytically active metal with high molecular fatty acids, such as stearic, oleic, palmitic, naphthenic, etc., acids. Thus, suitable catalysts are, for example, cobalt oleate or naphthenate, or iron linoleate. These salts are soluble in the liquid olefin feed and may be supplied to the first stage as hydrocarbon solution or dissolved in the olefin feed.

The synthesis gas mixture fed to the first stage may consist of any ratio of $H_2$ to CO, but preferably these gases are present in about equal volumes. The conditions for reacting olefins with $H_2$ and CO vary somewhat in accordance with the nature of the olefin feed, but the reaction is generally conducted at pressures in the range of about 1500 to 4500 p. s. i. g. and at temperatures in the range of about 150°–450° F. The ratio of synthesis gas to olefin feed may vary widely; in general, about 2500 to 15000 cubic feet of $H_2+CO$ per barrel of olefin feed are employed.

At the end of the first stage, when the desired conversions of olefins to oxygenated compounds has been effected, the product and the unreacted material are generally withdrawn to a catalyst removal zone, where dissolved catalyst is removed from the mixture and it is to this stage that the present invention applies.

One of the major problems involved in the aldehyde synthesis reaction is the fact that the catalyst metal and other carbonyl forming metals such as cobalt, iron, etc., through added as organic salts to the reaction zone, react with carbon monoxide under the synthesis conditions to form metal carbonyls. There is basis for the belief that the metal carbonyl or hydrocarbonyl is the active form of the catalyst. The carbonyl remaining dissolved in the reaction product from the primary carbonylation stage can thus be removed in an intermediate catalyst removal stage and this is customarily done by heating the primary reaction product in a suitable chamber or tower with or without packing at atmospheric or superatmospheric pressures and usually in the presence of a slow stream of an inert stripping gas such as hydrogen in order to remove overhead the carbon monoxide resulting from the decomposition of the metal carbonyl to protect the nickel or cobalt or other carbonyl forming metal employed in the subsequent high pressure hydrogenation stage. Though this process is quite satisfactory as far as removing the bulk of the cobalt carbonyl is concerned by decomposing the latter into metallic cobalt and carbon monoxide, and though the soluble cobalt in the primary reaction product may be substantially removed, small quantities of other metallic carbonyls, in particular iron carbonyl and also cobalt and iron soaps, are not completely removed by this process. Iron carbonyl arises from various sources such as from the interaction of carbon monoxide at high pressures with iron containing impurities in the feed, reaction of carbon monoxide with the walls of the reactor and transfer lines, reactor packing, and the like. Iron carbonyl is considerably more stable than the cobalt analogue and thus, while the latter is decomposed under decobalting conditions in the catalyst removal zone, or decobalter, iron carbonyl is only partially decomposed. Thus, while the concentration of cobalt carbonyl leaving the catalyst removal zone after treatment described above, may be 0.005% or less, the concentration of soluble iron is often as much as 0.02% or more. It is highly undesirable for soluble iron to be present in the product leaving the catalyst removal zone because of the tendency for the latter to decompose under the more severe conditions obtaining in the hydrogenation zone and in the preceding compressor, resulting in plugged lines and also deactivation of the hydrogenation catalyst and accordingly, it is highly desirable to keep the concentration of total carbonyls, both iron and cobalt, less than 0.005% in the effluent from the catalyst removal zone.

A further problem arising in the decobalter or catalyst decomposition zone is that, though the carbonyl decomposition, even of the cobalt, may be substantially complete, some of the cobalt liberated, reacts with formic acid, which appears to be formed either in the initial reaction zone or as a result of the decomposition of the cobalt carbonyl. The resulting cobalt formates are not readily decomposed under the conditions suitable for decomposing cobalt carbonyl, and hence, pass out with the effluent from the decobalter and are decomposed in the hydrogenation section, causing fouling of hydro catalyst and inlet lines and coils.

It is one of the purposes of the present invention to provide improved means for removing iron and other carbonyl-forming metals from the carbonylation reaction product and to prevent plugging of reactor lines and deactivation of the hydrogenation catalyst.

Another purpose of the invention is to provide an efficient means for decomposing substantially completely metal carbonyl compounds and soaps present in the carbonylation reaction effluent.

Other and further objects and advantages of the invention will become apparent from the description hereinafter.

These objects may readily be accomplished, and a reaction product obtained substantially free of dissolved metal, by subjecting the effluent from the catalyst removal zone to a preliminary catalytic hydrogenation reaction under substantially catalyst removal or decobalting conditions of temperature and pressure, i. e., under conditions that do not cause substantial reduction of aldehydes to alcohols, but that have the effect of completing the decomposition of iron carbonyl which, due to its greater stability, was not completely removed in the decobalting zone with the cobalt carbonyl and of cobalt and iron soaps formed in the reactor and decobalter. Thus, the hydrogen normally used in the decobalting zone as a stripping gas to decrease the partial pressure of the CO evolved in the decomposition is preferably passed first in countercurrent flow through the decobalted product in a preliminary catalytic hydrogenation zone to decompose residual iron and cobalt compounds; thereafter, the metal-free aldehyde product passes through a filter bed and then to the hydrogenation zone proper for conversion to the corresponding alcohol.

The present invention and its application will best be understood from the more detailed description hereinafter, wherein reference will be made to the accompanying drawing, which is a schematic representation of a system suitable for carrying out a preferred embodiment of the invention.

Referring now to the diagram, an olefinic hydrocarbon having one carbon atom less than the number of carbon atoms in the desired resulting oxygenated compound, and preferably alkali washed prior to reaction, is fed through feed line 4 to the bottom portion of primary reactor 2. The latter comprises a reaction vessel which may, if desired, be packed with non-catalytic material, such as Raschig rings, porcelain chips, pumice, and the like. Reactor 2 may be divided into discrete packed zones, or it may comprise but a single packed zone, or even, if desired, may contain no packing.

The olefinic feed preferably contains dissolved therein 1–3% by weight of cobalt naphthenate or oleate based on the olefin. Other compounds of cobalt may also be used. Simultaneously, a gas mixture comprising $H_2$ and CO in the approximate ratio of 0.5 to 2 volumes of $H_2$ per volume of CO is supplied through line 6 to primary reactor 2 and flows concurrently through reactor 2 with said olefin feed. Reactor 2 is preferably operated at a pressure of about 2500–3500 p. s. i. g. and at a temperature of about 250°–450° F., depending upon the olefin feed and other reaction conditions. The rate of flow of synthesis gases and olefin through a reactor 2 is so regulated that the desired conversion level of the olefin is obtained.

Liquid oxygenated reaction products containing catalyst in solution, and unreacted synthesis gases are withdrawn overhead from an upper portion of high pressure reactor 2 and are transferred through line 8 to cooler 10 in which any conventional means of cooling are employed, and from thence via line 12 to high pressure separator 14 where unreacted gases are withdrawn overhead through line 16, scrubbed in scrubber 18 of entrained liquid and cobalt carbonyl and used in any way desired. They may be recycled to synthesis gas feed line 6 via line 20 and booster compressor 19, or purged through line 21.

A stream of primary reaction product containing dissolved therein relatively high concentrations of cobalt carbonyl is withdrawn from separator 14 through line 22. A portion of said withdrawn stream may be recycled, if desired, to reactor 2 via line 24 to aid in the cooling and maintenance of temperature control of the primary carbonylation stage. The balance of the primary reaction product may be withdrawn through pressure release valve 26 and through line 28 and passed to decobalter 30. The withdrawn liquid may comprise any unreacted olefin as well as aldehydes, secondary reaction products, and dissolved cobalt and iron carbonyls.

Within decobalter 30, the bulk of the soluble cobalt carbonyl and some of the iron carbonyl is removed from the aldehyde product. Carbonyl decomposition is obtained by heating the aldehyde product by such means as closed steam coils to 200°–400° F. at a pressure just high enough to keep the components in the liquid phase. Pressures in the neighborhood of 100–500 p. s. i. g. are preferable. The product containing the carbonyls in solution is injected into decobalter 30 through lines 28 and 29 at a feed rate of about 0.5 to 2.0 v./v./hr. (volume of liquid per volume of reaction space per hour). Stripping gas, preferably hydrogen from the prehydrogenator 36 is admitted through line 34 into decobalter 30 at the rate of about 100 to 500 cubic feet/barrel to aid in decreasing the carbon monoxide partial pressure. If desired, it may be advantageous to operate with two or more decobalters, switching the stream from one to the other as the one in service accumulates excessive quantities of cobalt metal. Thus the stream of primary reaction products from separator 14 may be passed to decobalter 30 and prehydrogenator 36 in an analogous manner.

The gas stream comprising stripping gas, carbon monoxide, and some vaporized unreacted olefin may be removed overhead through line 46, and passed through cooler 48 to low pressure separator 50. The liquified olefin may be withdrawn through line 52 and may be recycled to the primary reactor 2. The uncondensed gases comprising hydrogen and some carbon monoxide are withdrawn overhead through line 54 and may, if desired, be removed from the system through line 60. However, they may be passed through a catalytic methanization zone 56 wherein the CO is converted in a known manner to methane, and the mixture of hydrogen and methane is passed into prehydrogenation oven 36. Under certain circumstances, it may be preferred to by-pass methanizer 56 by line 62.

Within prehydrogenator oven 36 there is dispersed any conventional hydrogenation catalyst, such as nickel, copper chromite, sulfactive hydrogenation catalyst such as tungsten, nickel, or molybdenum sulfide, preferably supported on carriers, such as pumice, diatomaceous earth, or activated carbon. Preferably, the catalyst is pilled in the form of pellets about ⅜ to about ½ inch or even larger, to reduce the possibilities of plugging due to suspended cobalt or iron metal.

Returning now to decobalter 30, liquid primary reaction product from which the bulk of the dissolved cobalt carbonyl has been removed but which may still contain in solution undecomposed iron carbonyl and metal soaps, is withdrawn through line 32 and passed into prehydrogenation ovens 36. To maintain continuous operation, it is preferable to maintain at least two decobalters and two prehydrogenation ovens in parallel, so that the streams may be switched when one set is down for cleaning.

Fresh hydrogen introduced through lines 44 and 40, as well as recycle hydrogen introduced through lines 58 and/or 64 and line 40 is passed through 36 at a relative high velocity of 1000–2000 feet/barrel, and the liquid feed rate of product through 36 is maintained at the rate of 2 to 10 v./v./hr. The liquid velocities employed are such that the suspended metals as well as those precipitated by the hydrogenation treatment in 36 are washed through the catalyst bed. The pressure and temperature maintained in reactor 36 are substantially of the same order of magnitude as those obtaining in decobalter 30. Thus temperatures within prehydrogenation oven 36 may be of the order of 300°–350° F. and pressures of about 100–500 p. s. i. g. Heat may be supplied, if required, by steam coils within reactor 36 (not shown).

Hydrogen is withdrawn overhead from 36 and passed into decobalter 30 for stripping purposes, as detailed above. Primary aldehyde reaction product, from which soluble metal carbonyls have now been substantially completely removed, but which may carry in suspension or dispersion finely divided solids, is withdrawn through line 38 and passed to low pressure separator 42. Overhead hydrogen is withdrawn through line 64 and is preferably recycled to the prehydrogenation zone.

The effluent from separator 42 withdrawn through line 66 is passed to filter 68 for removal of suspended and dispersed finely divided metal. Any conventional type filter, such as a sand filter bed, etc. may be employed.

Filtered aldehyde product is withdrawn from filter 68 and passed through line 69 and preheater 71 to the bottom portion of hydrogenation reactor 70 via line 72. In the last-named zone, conversion of the aldehyde product to alcohols is accomplished. Hydrogen is supplied to reactor 70 through line 74 in proportions sufficient to convert the aldehydes to the corresponding primary alcohols. Hydrogenator 70 may contain any conventional hydrogenation catalyst; if desired, it may be the same as in prehydrogenator 36, though this is by no means essential. Reactor 70 is preferably operated at temperatures of about 350° to 500° F., high pressures of about 2000 to 3500 p. s. i. g., liquid feed rate of about 0.4–0.6 v./v./hr., and a total gas rate of about 5000 cubic feet/barrel. The liquid feed rate in 70 is about 0.05–.10 that in 36, and generally clean-up hydrogenator 36 requires about 5–10% of the quantity of catalyst used in the high pressure hydrogenation stage in 70.

The products from the hydrogenation reactor and unreacted hydrogen may be withdrawn overhead through line 76 and passed to the products recovery system and alcohols recovered all in a manner known per se.

The inventors admit of numerous modifications apparent to those skilled in the art. Thus mention has not been made of various accessory equipment which normally are used in a commercial plant. Thus, in the interest of good heat economy, various heat exchangers and economizers would be employed to utilize whatever heat is available in the most effective and efficient manner and, in order to control the process, pumps, compressors, valves, flow meters, etc. would be included in the equipment. One such control device is an infrared analyzer recorder for measuring absorption spectra of cobalt and iron carbonyl in the decobalter. Thus, in order to insure efficient removal of iron and cobalt carbonyl from the aldehyde product, the holding or soaking time in decobalter 30 and prehydrogenator 36 may be controlled by measuring the amount of iron and cobalt carbonyl released. The analyzer records may be set to measure the amount of cobalt carbonyl by measuring the infrared spectra at 5.4 microns and amount of iron carbonyl at 5.0 microns. It thus is possible to tie in the analytical control system directly with the plant stream and to adjust the process variables, as heat, pressure soaking time, etc., in accordance with the amount of iron and cobalt carbonyl present. Similarly, the extent of reduction of the aldehyde product in the hydrogenation stage may be followed automatically by infrared measurement means, and the process variables of temperature, gas composition, etc. automatically adjusted to produce maximum reduction of carbonyl and ester compounds present.

What is claimed is:

1. In a carbonylation process wherein olefinic carbon compounds are contacted in an initial reaction zone with CO and $H_2$ in the presence of a cobalt carbonylation catalyst under elevated temperatures and pressures to produce reaction products comprising aldehydes containing at least one more carbon atom than said olefinic compounds and wherein metal compounds including metal carbonyls are dissolved in said reaction products and the solution comprising said reaction products and dissolved compounds is transferred to a catalyst removal zone wherein the bulk of the metal carbonyls are decomposed under conditions including a liquid feed rate of from about 0.5 to 2.0 v./v./hr., temperatures of about 200° to about 400° F. and pressures of about 100 to about 500 p. s. i. g. in the presence of a stripping gas, and wherein a liquid effluent comprising said aldehydes as well as a minor proportion of dissolved metallic compounds is withdrawn from said last-named zone and passed to a high pressure hydrogenation zone wherein said aldehydes are reduced to alcohols at pressures in the range of about 2000 to 3500 pounds and temperatures in the range of about 350° to about 500° F., the improvement of removing said minor proportions of dissolved metal compounds including significant amounts of iron carbonyl which comprises passing said effluent from said catalyst removal zone to a prehydrogenation zone, contacting said effluent in said zone with hydrogen and a hydrogenation catalyst at conditions of temperature and pressure, said pressures being in the range of from about 100 to 500 p. s. i. g. and said temperatures about 200° to 400° F., maintaining a liquid feed rate of about 2 to 10 v./v./hr. whereby said dissolved metal compounds are decomposed but said aldehydes are not substantially reduced, thereafter passing effluent from said prehydrogenation zone to the aforesaid high pressure hydrogenation zone wherein the aldehydes are reduced to alcohols.

2. The process of claim 1 wherein the liquid feed rate to said prehydrogenation zone is substantially greater than the liquid feed rate to said high pressure hydrogenation zone.

3. The process of claim 1 wherein hydrogen withdrawn from said prehydrogenation zone is employed as a stripping gas in said catalyst removal zone.

4. The process of claim 1 wherein catalyst employed in said prehydrogenation zone is in the form of large size pellets, and solids precipitated by said prehydrogenation treatment are carried out of said zone suspended in the effluent from said zone.

5. The process of claim 1 wherein a plurality of catalyst decomposition zones and prehydrogenation zones are maintained in parallel.

References Cited in the file of this patent

UNITED STATES PATENTS

| | | |
|---|---|---|
| 2,464,916 | Adams | Mar. 22, 1949 |
| 2,486,693 | Van't Spijker et al. | Nov. 1, 1949 |
| 2,504,682 | Harlan | Apr. 18, 1950 |
| 2,508,743 | Bruner | May 23, 1950 |
| 2,509,878 | Owen | May 30, 1950 |
| 2,514,961 | Max | July 11, 1950 |
| 2,571,160 | Parker et al. | Oct. 16, 1951 |
| 2,604,491 | Hale | July 22, 1952 |

OTHER REFERENCES

Fiat Final Report 1000, Listed by OTS in Bibliography of Scientific and Industrial Reports, Dec. 26, 1947, p. 28.